United States Patent
Kirsten

(10) Patent No.: US 11,154,385 B2
(45) Date of Patent: Oct. 26, 2021

(54) TOOTH UNIT AND METHOD FOR PRODUCING DENTURE BASE

(71) Applicant: Vita Zahnfabrik H. Rauter GmbH & Co., KG, Bad Säckingen (DE)

(72) Inventor: Armin Kirsten, Bad Säckingen (DE)

(73) Assignee: VITA ZAHN FABRIK H. RAUTER GMBH & CO. KG, Bad Saeckingen (DE)

( * ) Notice: Subject to any disclaimer, the term of this patent is extended or adjusted under 35 U.S.C. 154(b) by 44 days.

(21) Appl. No.: 16/320,593

(22) PCT Filed: Aug. 14, 2017

(86) PCT No.: PCT/EP2017/070572
§ 371 (c)(1),
(2) Date: Jan. 25, 2019

(87) PCT Pub. No.: WO2018/036853
PCT Pub. Date: Mar. 1, 2018

(65) Prior Publication Data
US 2019/0247166 A1    Aug. 15, 2019

(30) Foreign Application Priority Data
Aug. 26, 2016 (EP) ..................... 16185833

(51) Int. Cl.
*A61C 13/00* (2006.01)
*A61C 13/01* (2006.01)

(52) U.S. Cl.
CPC ...... *A61C 13/0006* (2013.01); *A61C 13/0004* (2013.01); *A61C 13/01* (2013.01)

(58) Field of Classification Search
CPC .. A61C 13/0006; A61C 13/0004; A61C 13/01
See application file for complete search history.

(56) References Cited

U.S. PATENT DOCUMENTS 4,521,193 A * 6/1985 Cialone ................. A61C 13/04
                                                                  260/998.11
4,776,795 A * 10/1988 Hornig ............... A61C 13/0003
                                                                  433/223

(Continued)

FOREIGN PATENT DOCUMENTS

DE    102014107418 A1    12/2015
EP       0266438 A1     5/1988

(Continued)

OTHER PUBLICATIONS

International Search Report dated Oct. 23, 2017 for PCT application No. PCT/EP2017/070572.

*Primary Examiner* — Nicholas D Lucchesi
(74) *Attorney, Agent, or Firm* — Ohlandt, Greeley, Ruggiero and Perle, LLP

(57) ABSTRACT

Artificial teeth are inserted in a denture base in order to produce a denture. The artificial teeth used according to the invention have an outer part, which is visible in the inserted state. An inner part is arranged in the denture base in the inserted state. A virtual data record of the artificial tooth, which corresponds to the outer side of the tooth, helps to define a virtual gum line in a region of the inner part of the tooth, which is undercut-free. In order to produce a denture base, cavities are created in the denture base. In order to be able to create the cavities with the help of automatic production methods such as CAD/CAM methods, the artificial teeth are virtually subtracted from a virtual denture base such that a cavity edge is defined, which corresponds to the virtual gum line.

14 Claims, 3 Drawing Sheets

(56) References Cited

U.S. PATENT DOCUMENTS

| | | | | |
|---|---|---|---|---|
| 4,865,546 A | * | 9/1989 | Naylor | A61C 11/02 433/213 |
| 5,607,628 A | * | 3/1997 | Palazzolo | A61C 13/0001 264/157 |
| 5,634,792 A | * | 6/1997 | Brisendine | A61C 13/0024 433/142 |
| 6,224,375 B1 | * | 5/2001 | Diasti | A61C 13/0003 264/18 |
| 7,153,135 B1 | * | 12/2006 | Thomas | A61B 5/1077 433/213 |
| 8,043,091 B2 | * | 10/2011 | Schmitt | A61C 13/0004 433/196 |
| 8,206,152 B2 | | 6/2012 | Holzner et al. | |
| 8,252,213 B2 | * | 8/2012 | Conrad | A61C 13/18 249/54 |
| 8,506,299 B2 | | 8/2013 | Gartner et al. | |
| 9,820,833 B2 | | 11/2017 | Noack | |
| 10,231,806 B2 | * | 3/2019 | Chou | A61C 19/05 |
| 10,470,855 B2 | * | 11/2019 | Morales | A61C 13/0019 |
| 10,568,721 B2 | | 2/2020 | Spatz et al. | |
| 10,675,131 B2 | * | 6/2020 | Morales | A61C 9/0046 |
| 2002/0163096 A1 | * | 11/2002 | Price | A61C 13/04 264/16 |
| 2003/0091959 A1 | * | 5/2003 | Shinozaki | A61C 13/1016 433/167 |
| 2007/0287131 A1 | | 12/2007 | Ruppert et al. | |
| 2010/0038807 A1 | * | 2/2010 | Brodkin | A61C 13/0019 264/17 |
| 2010/0196856 A1 | * | 8/2010 | Mancino | A61C 13/0003 433/201.1 |
| 2010/0283168 A1 | * | 11/2010 | Vandor | A61C 13/34 264/17 |
| 2012/0095732 A1 | * | 4/2012 | Fisker | A61C 5/20 703/1 |
| 2012/0179281 A1 | * | 7/2012 | Steingart | A61C 13/0004 700/97 |
| 2012/0258430 A1 | * | 10/2012 | Ruppert | B33Y 80/00 433/199.1 |
| 2012/0276502 A1 | * | 11/2012 | Marshall | A61C 13/0004 433/199.1 |
| 2012/0284000 A1 | * | 11/2012 | Nilsson | A61C 13/08 703/1 |
| 2013/0060532 A1 | * | 3/2013 | Clausen | A61C 13/0004 703/1 |
| 2013/0218531 A1 | * | 8/2013 | Deichmann | A61C 13/0004 703/1 |
| 2014/0272797 A1 | * | 9/2014 | Prestipino | A61C 9/0053 433/199.1 |
| 2015/0111177 A1 | | 4/2015 | Fisker et al. | |
| 2016/0095677 A1 | | 4/2016 | Morales et al. | |
| 2017/0202650 A1 | | 7/2017 | Bohm et al. | |

FOREIGN PATENT DOCUMENTS

| | | |
|---|---|---|
| EP | 1444965 A2 | 8/2004 |
| EP | 1864627 A2 | 12/2007 |
| EP | 2111180 A1 | 10/2009 |
| EP | 2666438 A2 | 11/2013 |
| WO | 2008005432 A2 | 1/2008 |
| WO | 2011066895 A1 | 6/2011 |
| WO | 2015078701 A1 | 6/2015 |

* cited by examiner

TOOTH UNIT AND METHOD FOR PRODUCING DENTURE BASE

BACKGROUND

1. Field of the Disclosure

The disclosure relates to a tooth unit with an artificial tooth for insertion into a denture base, as well as to a method for producing a denture base.

2. Discussion of the Background Art

The standard of the provision of patients with partial or full dentures is high today. A dentist prepares the situation to be treated at the patient, while the (partial) denture is usually produced in an external laboratory or a practice laboratory by an orthodontist according to the dentist's specifications. Here, the quality of the denture depends largely on the skilled craftsmanship of the orthodontist who has to consider the dentist's specifications while producing the denture, as well as on the quality of these specifications.

Further, the preparation of the patient to be provided with a denture often involves inconveniences for the patient. To be noted in this context are e.g., various sessions at the treating dentist, during which impressions of the situation to be treated have to be made, which serve the orthodontist as negative models. The subsequent further impressions are time-consuming and are often the reason for an imprecise execution of the prosthetic treatment. Typically, two or three impression sessions are required, before the orthodontist can start with the actual production of the denture.

WO 2011/066895 A1 relates to a method for the automated production of dentures comprising the steps of providing a digital data set of the individual denture to be produced, digitally separating the model into dental arch and gingiva, producing the dental arch from ceramics and plastic material using cutting technology or producing the denture base using generative or ablative methods from predominantly (meth) acrylate-based plastic materials, connecting the dental arch and the gingival mass through bonding or joining or a combination of bonding and joining.

EP 2 11 181 A1 relates to a method for producing a base part of a denture or a denture having a base part with the step of forming the base part using a rapid prototyping method, such as e.g. 3D lithography and in particular 3D laser lithography. Further, a method is disclosed for creating a data set that represents the shape of a base part of a denture, wherein a gingiva area or a model of the same is scanned and/or a model of a base part is scanned and/or the shape pf the base part is simulated on a computer.

EP 1 864 627 A2 discloses a method for manufacturing a denture according to a digitized virtual model, which reflects the maxillary situation, comprising the steps of providing a data record that reflects the maxillary situation and relationship, digital modeling of the tooth (automatically, as an option), creating a divided negative mold (rapid manufacturing) from the data from the digital tooth modeling, inserting the fabricated teeth/fabricated tooth units into the opened negative molds, closing the negative molds, and filling any remaining cavity with plastics for the denture.

EP 1 444 965 A2 relates to a method for the production of dental prosthesis, with the steps of recording and digitizing (scanning) the 3-dimensional, anatomical relationships in the oral cavity; if applicable, recording and digitizing (scanning) the 3-dimensional data of bite molds incl. bite blocks; if applicable, recording the jaw data which are normally taken on the patient for adjusting the articulator; processing the data set obtained, such that the relevant anatomical structures are secure for a virtual tooth placement and a virtual model is obtained as a data set; followed by the selection of the 3-D data sets of fabricated, previously scanned-in teeth from a further data set; virtual placement of the teeth into the virtual model as a second data set, as well as either followed by transferring the virtual placement onto the model either by a positioning template (e.g. milled or rapid prototyped) or by direct placement of the fabricated teeth on the model, fixing the teeth on the model, fastening the prosthesis base, or, according to another alternative, followed by a direct manufacture of the prosthesis base—according to the data of the virtual tooth placement—with positioning aids for the final correct positioning and fixing of the fabricated teeth.

WO 2008/005432 A2 discloses a system for producing at least a part of a denture. The system comprises a three-dimensional scanning a surface of a denture model and a computer readable medium with a computer program for receiving data from the scanning device, a 3-dimensional model of the surface and, if necessary, for modifying the 3-dimensional model and/or adding functions to the 3-dimensional model. The system also comprises a processing for generating at least a part of the denture from a selected model with consideration to the 3-dimensional model. The processing can be performed in a manner either removing or building up material.

From WO 2015/078701 an artificial tooth for insertion into a denture base is known, having a visible outer part and an inner part arranged inside the denture base when in the inserted state. Here, the tooth is designed such that a tooth edge is formed between the outer part and the inner part.

Here, the tooth edge is designed such that a change of angle occurs there. In this regard, it is a clearly visible or defined edge or line. There is no continuous transition from the outer part to the inner part of the tooth at the tooth edge. Rather, the angle changes abruptly. Further, the artificial tooth is designed such that the inner part is undercut-free with respect to an insertion direction in which the tooth is inserted into the denture base. Artificial teeth produced according to WO 2015/078701, however, have the disadvantage that a clearly defined tooth edge with a change of angle must be provided to be able to produce the artificial tooth and to correctly insert it into the denture base. In view of this, there is a need, in particular for such an automatic method for producing a denture, to be able to also provide artificial teeth without a tooth edge having a change of angle.

For the improvement of the method for producing a denture base, it is an object of the disclosure to provide a tooth unit with suitable artificial teeth, wherein in particular an automated method for producing a denture base is to be provided.

SUMMARY

The tooth unit of the present disclosure comprises an artificial tooth for insertion into a denture base and a virtual data set of this tooth. In the state inserted into the denture base, the artificial tooth has a visible outer part and an inner part arranged inside the denture base. The virtual data base of the tooth includes data of the outer geometry and the surface geometry of the tooth, respectively.

The inner part of the artificial tooth is to be designed such that, relative to a direction of insertion or a push-in direction in which the tooth is inserted into the denture base, no undercuts are provided. The insertion is significantly facilitated thereby. In particular, the production of the cavity in the denture base, which correspondingly is also free of undercuts in the direction of insertion, is possible in a much simpler way.

According to the disclosure a virtual gingiva line is formed in the virtual data set of the tooth in the region free of undercuts in the direction of the inner part. The line defines the transition from the outer part visible in the inserted state and the invisible inner part of the tooth. Since, according to the disclosure, the virtual gingiva line is arranged in the undercut-free region of the tooth, inserting the tooth into the denture basis in the direction of insertion or the push-in direction is possible in a simple manner. In the extreme case, the virtual gingiva line may exactly describe the line where, relative to the direction of insertion or the push-in direction of the tooth into the denture base, the region starts in which no undercut exists anymore.

Using the tooth unit of the present disclosure, it is thus possible to also clearly define teeth that have no tooth edge at which a change of angle occurs. Further, it is possible to arrange the virtual gingiva line at different heights with respect to the inserted state of the tooth. For example, a gingiva line may be arranged lower, so that it corresponds to a rather older tooth with a somewhat receding gingiva. In this regard, an exact adaptation to a patient's situation can be made in a very simple manner.

The artificial tooth of the present disclosure is preferably developed such that the virtual gingiva line is designed to extend all around the circumference. Thus, the virtual gingiva lune is a line closed in itself. This is advantageous in particular with automatic production methods such as CAD/CAM. methods It is further preferred that the artificial tooth is worked only on the outer part for an individualization of the tooth shape. This is advantageous in that a clearly defined inner part exists, which is important in particular for automatization, and therefore, the cavities can be formed automatically in the denture base. The shape and the depth of the cavities are thus clearly predefined.

In a particularly preferred development of the artificial tooth of the present disclosure, the inner part has a minimum outer radius of at least 0.6 mm. The smallest radius existing in the region of the inner part is thus 0.6 mm or more. This is advantageous in particular for the production of the cavity in a denture base. It is particularly preferred that the minimum outer radius is at least 1.0 mm and in particular at least 1.25 mm.

Further, it is preferred that the inner part of the artificial tooth is designed to be non-symmetric. Specifically, the inner part is not rotationally symmetric in shape. Thus, an erroneous insertion into the denture base is avoided.

For the complete production of a denture a plurality of teeth according to the disclosure is present in a library from which a certain arrangement of teeth may be selected.

Further, a denture base is provided for the production of a denture. The denture base has a plurality of cavities, each for receiving an artificial tooth as described and advantageously developed above. Here, with respect to a direction of insertion of a corresponding artificial tooth into the denture base, the cavities are designed such that the cavities are free from under-cuts. This makes a simple arrangement of the artificial teeth possible in the corresponding denture base.

Preferably, the individual cavities of the denture base are designed to be complementary to the respective inner part of the artificial tooth to be inserted in a corresponding manner. Thereby, a gap of a constant width is formed between the respective cavity and the inner part of the associated tooth. This guarantees a reliable fastening of the artificial tooth in the denture base.

In a particularly preferred development of the denture base, the cavity has a minimum inner radius equal to or larger than the minimum outer radius of the inner part of the artificial tooth. If, for example, the inner part of the artificial tooth has an outer radius of at least 0.6 mm or more, the cavity exclusively has radii of at least 0.6 mm or more. This has the advantage that tools, such as a milling tool, can be used in producing the cavities, whose milling head or the like has a corresponding working radius. At a radius of at least 0.6 mm, a milling head with a diameter of 1.2 mm can be used. For the production of smaller radii, a smaller milling head would have to be used. The use of smaller milling heads or corresponding tools would lead to longer production times for the cavity as well as to a shorter service life of the tool. Therefore, it is further preferred that the minimum inner radius of the cavity is in particular equal to or larger than 1.0 mm and, as is particularly preferred, equal to or larger than 1.25 mm.

Specifically, when using non-symmetrically, in particular rotationally non-symmetrically designed artificial teeth, the cavities are also correspondingly non-symmetrically and, in a preferred embodiment, in particular rotationally non-symmetrically designed. This has the essential advantage that a clear association of a respective artificial tooth to the corresponding cavity, as well as a clear positional definition of the corresponding tooth in the cavity is given in a clear and unique manner.

Therefore, it is particularly preferred that all cavities differ in shape so that a unique association of the artificial tooth to the cavity exists. Thus, an erroneous insertion is excluded.

It is further preferred that the cavities are designed, in particular with regard to the depth, such that an inserted artificial tooth has a defined tooth height.

Further, it is particularly preferred in particular also for aesthetic reasons that the virtual gingiva line of the artificial tooth coincides at least partly, in particular completely, with the cavity edge in the inserted state or the two edges overlap in particular completely.

In the method of the present disclosure for producing a denture base, a virtual embedding of at least one artificial tooth of the present disclosure into a virtual denture base or a virtual gingiva is performed. In the next step, a cavity edge is defined such that it overlaps at least partly, in particular completely, with the virtual gingiva line. Preferably, the virtual gingiva line is transferred onto the denture base for the definition of the cavity edge. This is still performed in a virtual manner so that a virtual cavity edge is created in the virtual denture base for the at least one tooth of the disclosure. Preferably, when the denture with the inserted artificial tooth is completed, the cavity edge coincides with the virtual gingiva line. After the definition of the at least one cavity edge, the real denture base is produced by forming a cavity in a denture basic body. Specifically, this is performed by milling the cavity. The cavity is preferably produced using a CAD/CAM method. According to the disclosure, for performing a CAM method, the cavity edge is used to define a tool movement. Here, the cavity edge serves as the boundary curve for developing the milling strategy. In the CAM, the milling paths are generated from the boundary curve and the known cavity geometry. For the production process, the necessary parameters for a milling process, which are known from prior art, are defined (number of rotations, feed, lateral and depth infeed . . . ).

It is particularly preferred that defining the virtual cavity edge is performed by virtual subtraction of the tooth from the virtual denture base. Thereby, it is possible to achieve a transfer of the virtual gingiva line onto the virtual denture base and thus a definition of the cavity edge in a simple manner.

The cavity to be produced in the denture base in particular by means of a CAD/CAM method is, in a particularly preferred embodiment, complementary to the lower side or the inner part of the tooth. Thereby, a bonding gap can be defined which has a constant width or thickness all over the entire bonding surface. This has the advantage that an extremely precise and clearly defined insertion of the tooth into the cavity is guaranteed. Further, there is the advantage that due to the clearly defined bonding gap, the volume of the bonding gap is also clearly defined and thus a predetermined quantity of adhesive can be introduced into the cavity, whereby it can be avoided that adhesive is squeezed out in the region of the cavity edge or tooth edge. This is advantageous in that the port-processing steps can be simplified or possibly be omitted altogether.

In particular for a good automatization, it is particularly preferred that also the cavities in the denture base are formed such that no undercuts occur in the direction in which the tooth is inserted or pushed in.

The production of the cavities is preferably performed using a machining tool, such as a milling tool. In this regard, it is preferred that the tool has a working radius that is equal to or larger than the minimum outer radius of the inner part of the artificial tooth. For example, a milling head has a diameter of 1.2 mm, if the minimum outer radius of the inner part is at least 0.6 mm.

It is particularly preferred that a plurality, in particular all of the teeth of a dental arch are embedded virtually into the virtual dental base using the method of the present disclosure described above with reference to a single tooth. Accordingly, it is preferred that all associated cavity edges are defined in particular by virtual subtraction and that, thereafter, as described above with reference to a single tooth, all associated cavities are produced, preferably with the use of a CAD/CAM method.

Prior to the at least one tooth of the present disclosure being embedded into a virtual denture base in a manner defined by the present disclosure, the following method steps can preferably be executed:

determining an oral situation of a patient by making impressions or by digital imaging,
possibly, digitizing the oral situation of a patient,
selecting the teeth forming the dental prosthesis from an ideally calculated arrangement according to a corresponding arrangement concept of the teeth or of sets of teeth, whereby a virtual arrangement of the teeth is obtained that is positioned virtually in a space that gives consideration to the patient's situation determined,
virtually embedding the teeth set up in the virtual arrangement into a virtual denture base.

The arrangement concept is established e.g., by a treating dentist, in particular in a patient-specific manner.

Partial or full dentures are removable, conditionally removable or fixed dentures.

Taking an impression in the mouth of a patient (patient situation) can be done in particular by means of impression masses. According to the disclosure an impression can be used advantageously for a first impression, a second impression (functional impression) and for bite registration.

In the method of the disclosure, an impression can be made using conventional devices, so-called impression spoons. A particularly suitable impression spoon is an impression spoon that allows for a contact congruent with the mucosa. The edge portions should be reduced. The impression spoon should be configured to receive impression material and to receive a vertical mechanism for bite adjustment, as well as posterior geometries for bite fixation.

In one embodiment of the present disclosure the digital recording of the patient situation is performed using imaging methods, in particular optical methods such as camera capturing, computer tomography or ultrasound.

In another embodiment of the method of the present disclosure, the library contains models of dental arches, tooth shapes and sizes and combinations thereof, as can be found e.g. in Vita shape cards no. 1694 and no. 1756. The library preferably considers overall arrangements and/or modular arrangements for all occlusion classes according to Angle. If so desired, the library may also include models of the gingiva in different age-related manifestations.

The method of the present disclosure advantageously allows for the adaptation of the dental arch to the individual width of the jaw arch of the patient by giving consideration to virtual hinges which are enhanced by a functionality in the form of a movement element (inward and outward directed movement), e.g. between tooth 11 and tooth 21 in the upper jaw and tooth 31 and tooth 41 in the lower jaw. The design of the gingiva may be individualized in a virtual manner e.g. by inserting palatal ridges or by adjusting the A-line as well as the etchings. For the palatal ridges, it is preferred to insert stored virtual models of the ridges into the virtual model of the denture. Here, it can be useful to individually modify the models according to the shape of the denture, e.g. by stretching or compressing as well as by mapping onto the palate surface. Etching is modified by virtual modification of the material thickness in the vicinity of the A-line, the A-line itself can be displayed and modified as a curve or boundary line in the virtual model.

These method steps are described in detail in PCT/EP2013/062279, which is incorporated by reference in its entirety.

The disclosure will be described in more detail hereinafter with reference to a preferred embodiment and to the accompanying drawings.

DETAILED DESCRIPTION OF THE PREFERRED EMBODIMENT

For producing a complete denture, i.e. a denture base into which artificial teeth are inserted, the following steps are executed for example:

determining an oral situation of a patient by making impressions or by digital imaging, possibly, digitizing the oral situation of a patient,
selecting the teeth forming the dental prosthesis from an ideally calculated arrangement according to a corresponding arrangement concept of the teeth or of sets of teeth, whereby a virtual arrangement of the teeth is obtained that is positioned virtually in a space that gives consideration to the patient's situation determined,
virtually embedding the teeth set up in the virtual arrangement into a virtual gingiva or a virtual denture base,
producing the real denture.

This method is described in particular in PCT/EP2013/062279.

This method is developed according to the disclosure such that artificial teeth designed according to the disclosure are used. A corresponding library thus includes a great number of teeth designed according to the disclosure. The same differ in tooth shape, tooth size etc. In particular, a common feature of the artificial teeth according to the disclosure is the forming of a virtual gingiva line with a change of angle.

Figure 1:
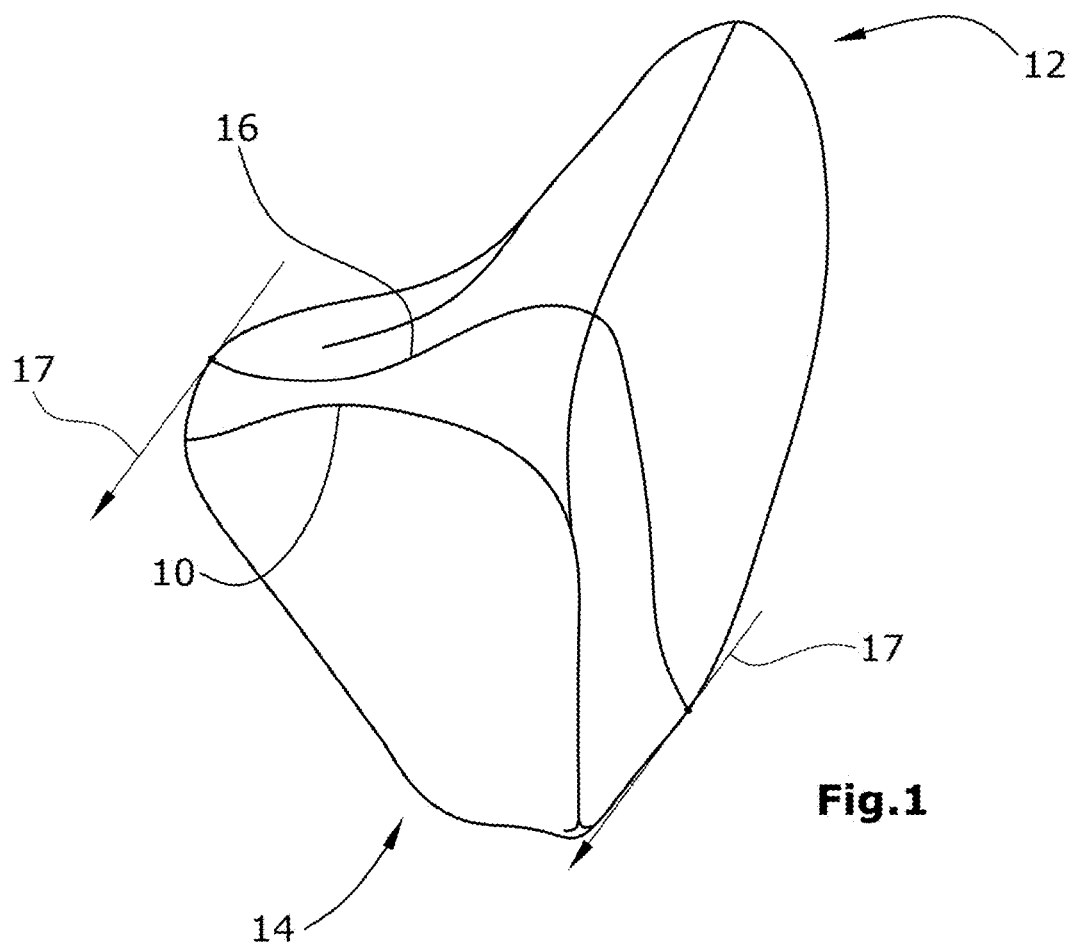
FIG. 1 is a schematic perspective side view of an artificial tooth according to the disclosure.
Figure 2:
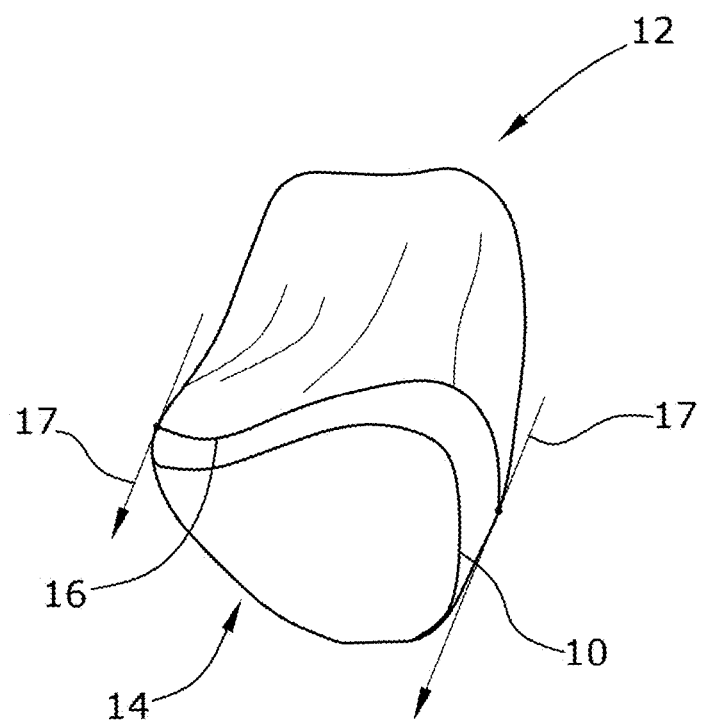
FIG. 2 is a schematic perspective rear view of an artificial tooth according to the disclosure.

The virtual gingiva line 10 is illustrated in the example of a tooth, in this case an incisor, shown in FIGS. 1 and 2. The artificial tooth shown as an example has an outer part 12 and an inner part 14. The outer part 12 is separated from the inner part 14 by the virtual gingiva line 10. With the artificial tooth inserted into the denture base, the outer part 12 is arranged outside the denture base or visible. The inner part 14 is arranged inside the denture base in the inserted state and is thus not visible.

The virtual gingiva line 10 is designed as a circumferential line closed in itself. Using the data set of the tooth, this virtual gingiva line 10 is made in the direction of the inner part 14 in the undercut-free region. The virtual gingiva line is located in the undercut-free region. The undercut-free region is defined by a line 16. Here, the line 16 defines the border of the undercut-free region in the insertion or push-in direction. In FIG. 1, no undercut is made blow the line 16 with respect to the direction of insertion (arrows 17) into the denture base. Above the line 16, an undercut is provided.

Figure 3:
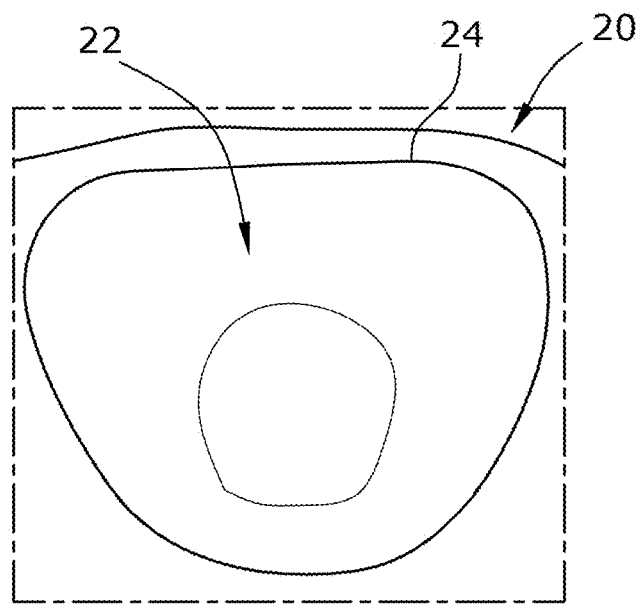
FIG. 3 is a schematic perspective top view of a cavity in a denture base.

First, for producing a denture base 20 (FIG. 3), the individual teeth are subtracted from a virtual denture base. Thus, it is possible to virtually create a denture base 20 with cavities 22 respectively designed for each tooth. The virtual denture base 20 thus has a cavity 22 limited by a cavity edge 24. The cavity edge 24 is created by the virtual subtraction of the tooth from the denture base 20 and corresponds to the virtual gingiva line 10.

The forming of the cavities 22 in the denture base 20 is preferably performed using CAD/CAM methods. These use the cavity edge 24 to define the milling paths or the movement paths of other tools. This allows for a very exact and automatic forming of the cavities 22.

Figure 4:
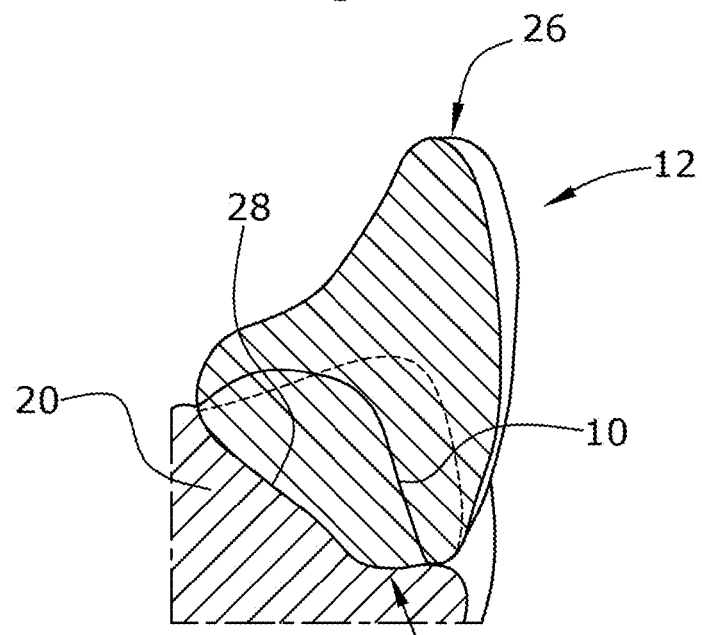
FIG. 4 is a schematic sectional view of a tooth inserted into the cavity.

Since it is particularly preferred that the inner part 14 of the teeth has no undercuts in a direction of insertion (26) FIG. 4) of the teeth into the cavities 22, a simple assembly or a simple insertion/bonding into the cavities 22 is possible. Here, the cavities 22 also have no undercut in the corresponding direction of insertion. The direction of insertion 26 substantially extends perpendicularly to the denture base. With the denture arranged in the oral cavity of the patient, the direction of insertion would extend substantially vertically.

The cavity 22 is formed to be complementary to the inner part so that an exact positional definition of the tooth in the cavity 22 is given. By a complementary design of the inner part 14 and the cavity 22, it is further possible to obtain a bonding gap 28 (FIG. 4) having a constant width over its entire surface. As such, the volume of the bonding gap and thus the necessary quantity of adhesive are also known exactly.

In FIG. 4, which illustrates the tooth and also the denture base 20 in section, the virtual gingiva line 10 is shown in addition. Here, the part of the virtual gingiva line 10 shown as a solid line extends in front of the drawing plane with reference to the sectional surface of the tooth, and the part shown in broken lines extends behind the drawing plane.

Figure 5:
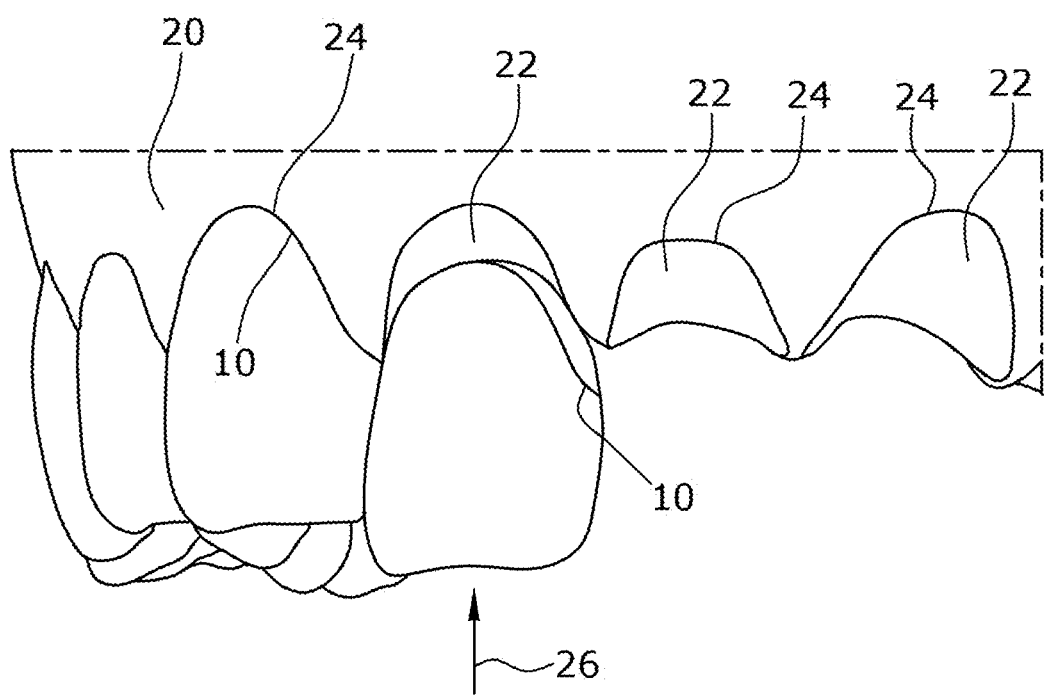
FIG. 5 is a perspective view of a denture base with artificial teeth, some of which are inserted.

For a complete production of a denture a plurality of cavities 22 (FIG. 5) is provided in a denture base 20. First, a clearly defined quantity of adhesive is introduced into the individual cavities, and then the corresponding teeth are inserted into the cavities 22 in the direction of insertion 26. With the teeth inserted, the cavity edge 24 and the virtual gingiva line 10 overlap.

What is claimed is:

1. A tooth unit, comprising:
an artificial tooth configured for insertion into a denture base; and
a virtual data set of the artificial tooth,
the artificial tooth having an outer part visible when inserted in the denture base, and an inner part inside the denture base when inserted in the denture base, and
the virtual data set corresponding to an outer geometry of the artificial tooth,
wherein the virtual data set has a virtual gingiva line at a transition from the outer part to the inner part,
wherein the inner part is free of undercuts, is non-symmetric, and has a minimum outer radius of at least 0.6 mm, and
wherein the virtual gingiva line is located in the virtual data set corresponding to a region of the artificial tooth that is free of the undercuts.

2. The tooth unit of claim 1, wherein the virtual gingiva line is located in the virtual data set corresponding to a position that extends completely circumferentially around the artificial tooth.

3. A denture, comprising:
a denture base with a plurality of cavities; and
the tooth unit of claim 1 inserted in a cavity of the plurality of cavities, wherein the cavity is free of undercuts with respect to a direction of insertion in which the artificial tooth is inserted into the denture base, and wherein the cavity has an edge and the virtual gingiva line is located in the virtual data set corresponding to a position that overlaps the edge at least in part.

4. The denture of claim 3, wherein the cavity is formed to be complementary to the inner part of the artificial tooth so that a gap of constant width is formed between the cavity and the inner part.

5. The denture of claim 3, wherein the cavity is non-symmetric and/or differs in shape from other cavities in the plurality of cavities.

6. The denture of claim 3, wherein the cavity is designed such that the artificial tooth has a defined tooth height.

7. The denture of claim 3, wherein the cavity has a minimum inner radius that is equal to or larger than the minimum outer radius of the inner part.

8. A method for producing a denture base, comprising the following steps:
determining a virtual data set of an artificial tooth that has an inner part that is free of undercuts, is non-symmetric, and has a minimum outer radius of at least 0.6 mm;
virtually embedding the virtual data set of the inner part of the artificial tooth into a virtual denture base;

determining a virtual gingiva line as an outer part of the artificial tooth that is visible when the virtual data set of the inner part is virtually embedded in the virtual denture base;

transferring the virtual gingiva line onto the virtual denture base to define a location of a cavity edge;

providing a denture basic body;

producing the denture base by forming a cavity in the denture basic body that matches the location of the cavity edge so that the cavity is free of undercuts with respect to a direction of insertion in which the artificial tooth is inserted into the denture base, wherein the virtual gingiva line overlaps the cavity edge at least in part, and wherein the virtual gingiva line is arranged in a region that is free of the undercuts; and inserting the artificial tooth into the cavity in the direction of insertion.

9. The method of claim 8, wherein the cavity is made using CAD/CAM methods, wherein the cavity edge serves to define a tool movement.

10. The method of claim 8, wherein, for forming a bonding gap of constant width, the cavity is produced to be complementary to the inner part of the artificial tooth.

11. The method of claim 8, wherein a tool for forming the cavity has a working radius that is equal to or greater than the minimum outer radius of the inner part.

12. The method of claim 8, further comprising repeating the determining the virtual data set step, the virtually embedding step, the determining the virtual gingiva line step, and the transferring step for a plurality of teeth, wherein the producing step comprises forming a cavity in the denture basic body that matches the location of the cavity edge for each of the plurality of teeth.

13. The method of claim 8, wherein, prior to the virtual embedding step, the method further comprises the steps of:

determining an oral situation of a patient by making impressions or by digital imaging and digitizing the oral situation of a patient;

selecting teeth from an ideally calculated arrangement according to a corresponding arrangement concept of the teeth or of sets of teeth, whereby a virtual arrangement of the teeth is obtained that is positioned virtually in a space that gives consideration to the oral situation; and virtually embedding the teeth set up in the virtual arrangement into the virtual denture base.

14. The method of claim 8, wherein the cavity edge is defined by virtual subtraction of the tooth from the virtual denture base.

\* \* \* \* \*